Figure 1:
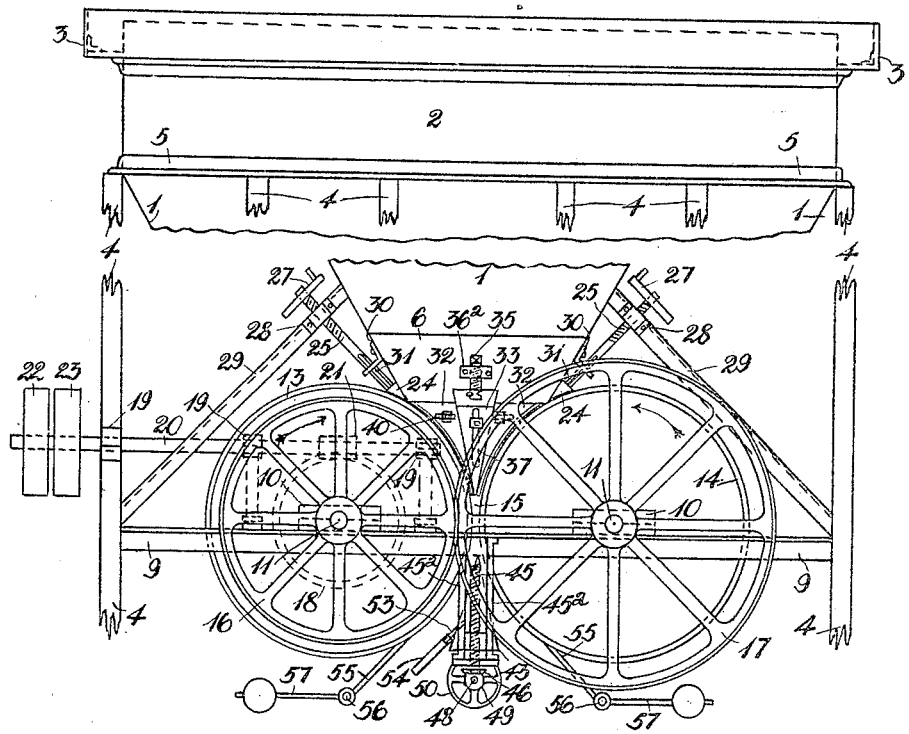

A. J. ARBUCKLE.
MEANS FOR SEPARATING COMMINUTED ORES OR OTHER SOLID MATTER FROM LIQUIDS.
APPLICATION FILED OCT. 19, 1908.

958,068.

Patented May 17, 1910.

3 SHEETS—SHEET 1.

Witnesses:
Chas Ovendale
J. Ovendale

Inventor:
Alexander John Arbuckle

A. J. ARBUCKLE.
MEANS FOR SEPARATING COMMINUTED ORES OR OTHER SOLID MATTER FROM LIQUIDS.
APPLICATION FILED OCT. 19, 1908.

958,068. Patented May 17, 1910.
3 SHEETS—SHEET 2.

Witnesses:
Chas. Ovendale
H. Windale

Inventor:
Alexander John Arbuckle

A. J. ARBUCKLE.
MEANS FOR SEPARATING COMMINUTED ORES OR OTHER SOLID MATTER FROM LIQUIDS.
APPLICATION FILED OCT. 19, 1908.
958,068.
Patented May 17, 1910.
3 SHEETS—SHEET 3.
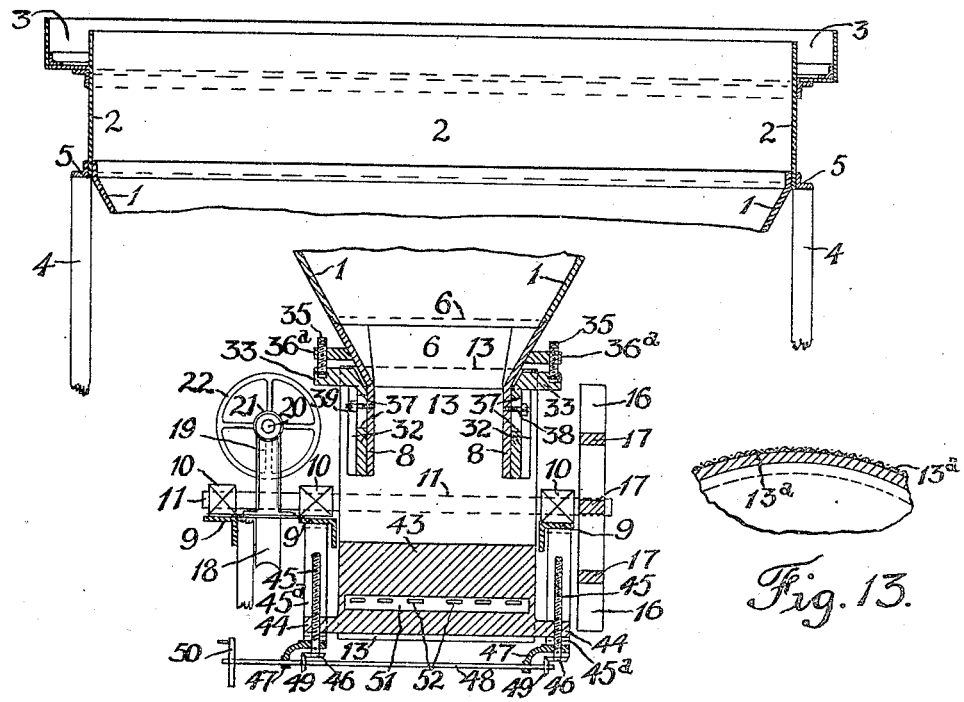
Fig. 12.
Fig. 13.
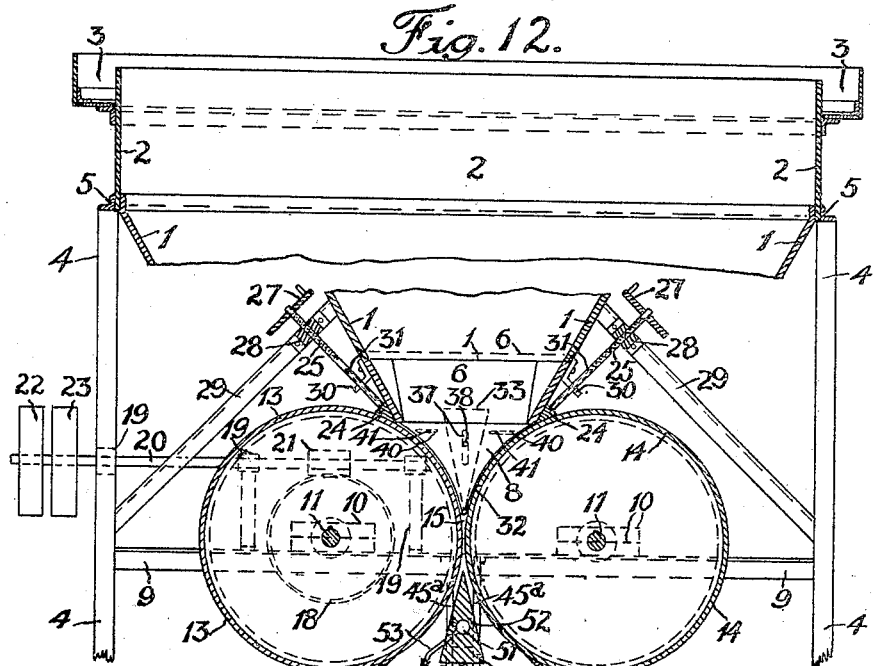
Fig. 11.
Witnesses:
Chas. Ovendale
J. Ovendale
Inventor
Alexander John Arbuckle

UNITED STATES PATENT OFFICE.

ALEXANDER JOHN ARBUCKLE, OF JOHANNESBURG, TRANSVAAL.

MEANS FOR SEPARATING COMMINUTED ORES OR OTHER SOLID MATTER FROM LIQUIDS.

958,068.  Specification of Letters Patent.  Patented May 17, 1910.

Application filed October 19, 1908. Serial No. 458,540.

*To all whom it may concern:*

Be it known that I, ALEXANDER JOHN ARBUCKLE, a subject of the King of Great Britain, and resident of Johannesburg, Transvaal, have invented certain and useful Improvements in Means for Separating Comminuted Ores or other Solid Matter from Liquids, of which the following is a specification.

This invention relates to means for separating comminuted ores or other solid matter from liquids. It is applicable for separating the solids from the liquid of "mill-pulp" (the mixture of crushed ore products and liquid as it comes from the reduction plant), or for separating sands (the coarser products of crushed ore), or slimes (the finer products of crushed ore), from cyanid or other solvent solution, wash water or other liquid.

The object of the invention is to obtain a continuous separation of the solids from the liquid by removing the settled solids while the separation is proceeding.

For the carrying out of the invention I may employ an inverted conical tank, or other vessel having inwardly and downwardly inclined sides for the whole or any suitable portion of its height. Into this tank or vessel the mixture of solids and liquid is conducted, the settlement of the solids taking place therein while the liquid overflows. The vessel is provided with an aperture at the bottom through which the solids are withdrawn. This aperture is partially closed by means of a rotatable drum or cylinder, or drums or cylinders, extending the full length of said aperture. The drum or cylinder, or drums or cylinders, may be covered with canvas or similar material, or be otherwise provided with a roughened surface to facilitate the withdrawal of the solids from the vessel. Means are provided for making a liquid-tight joint between the vessel and the drum or cylinder, or drums or cylinders, to prevent egress of the mixture when the apparatus is being put into operation. Means may be provided for scraping off the solids which adhere to the surface or surfaces of the drum or cylinder, or drums or cylinders, and if desired a liquid supply may also be provided for washing said surfaces.

The invention will now be more fully described by aid of the accompanying drawing wherein the apparatus is shown provided with two drums or cylinders.

Figure 2:
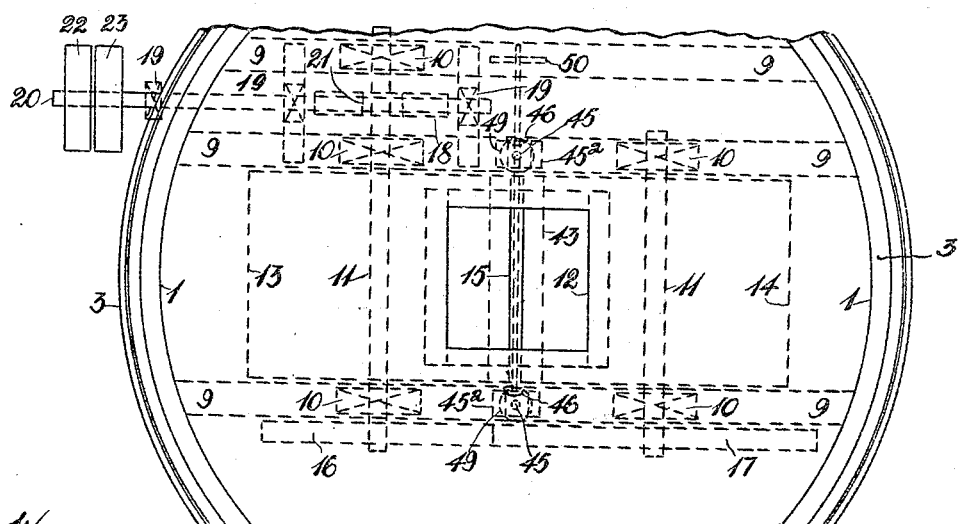
Figure 3:
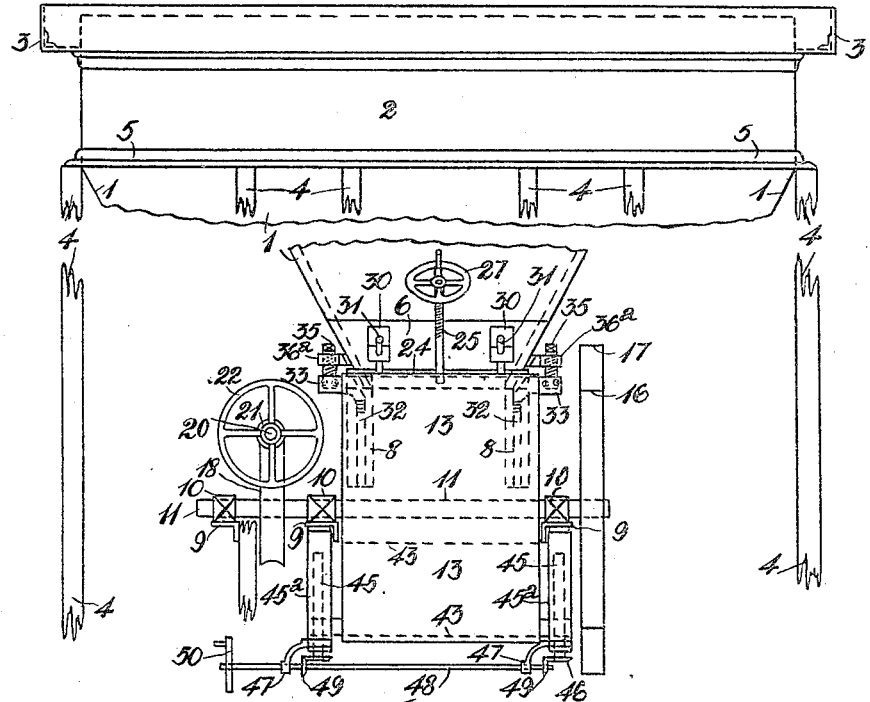
Figure 4:
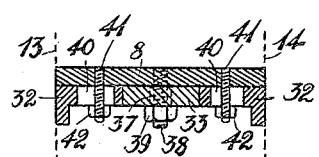
Figure 7:
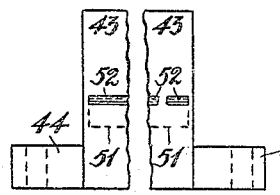
Figure 8:
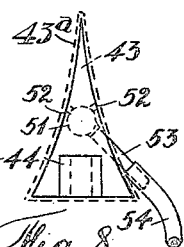
Figure 5:
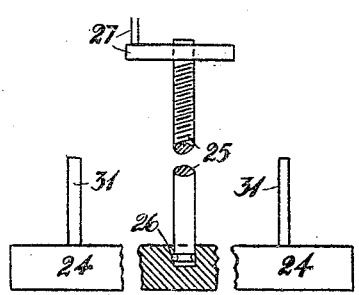
Figures 6, 9, 10:
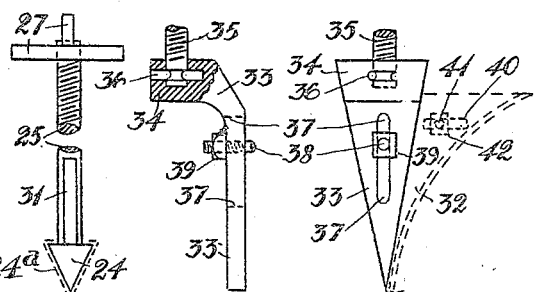

Figure 1 is a side elevation of sufficient of a settling vessel to illustrate the application thereto of the invention. Fig. 2 is a plan of Fig. 1. Fig. 3 is an elevation at right-angles to Fig. 1. Fig. 4 is a horizontal section of the movable side plates 32 and their actuating wedge 33. Fig. 5 is a front elevation of portions of one of the longitudinal wedges 24 and its actuating screw 25. Fig. 6 is an end elevation of Fig. 5. Fig. 7 is an elevation of portions of the wedge 43 for closing the outlet 15 formed between the drums. Fig. 8 is an end elevation of Fig. 7 showing the liquid supply connection. Fig. 9 is a side part sectional elevation of the wedge 33 for actuating the movable side plates 32, and Fig. 10 is a front elevation of Fig. 9 showing one of the movable side plates 32 in dotted lines. Fig. 11 is a central, vertical sectional view through the vessel 1 and transversely of the drums 13, 14. Fig. 12 is a vertical sectional view at right angles to Fig. 11. Fig. 13 is a cross-section of a portion of one of the drums 13, 14, showing the material 13$^a$ to provide the rough surface.

In Figs. 1, 2 and 3, 1 represents an inverted truncated conical vessel such as is commonly employed in the treatment of auriferous ores for separating comminuted ore from liquid. Instead of an inverted conical vessel I may employ any inverted pyramidal vessel whose sides are inclined inwardly from the top to the bottom for the whole or any suitable portion of its height. As shown the vessel 1 has a cylindrical upper portion 2 which at the top is surrounded by an annular overflow or rim launder 3. The vessel 1 is carried by means of posts 4 and the angle iron flange 5. To the bottom of the conical vessel 1 is riveted or otherwise suitably affixed a truncated pyramidal piece or casting 6, the lower and open end of which constitutes the discharge aperture 12 for the settled solids. This piece 6, on two opposite sides, is constructed with downwardly extending vertical extensions or projections 8 curved at the sides, see Figs. 3, 4 and 11.

9 are three horizontal angle irons arranged below the vessel 1 and suitably fixed to the posts 4. These angle irons 9 carry bearings 10 for two horizontal and parallel drum shafts 11 which are equi-distant from the center of the aperture 12. Upon these shafts are keyed or otherwise suitably fixed two drums or cylinders 13, 14, which are somewhat longer than the aperture 12.

As shown in Fig. 13 the drums or cylinders 13, 14 may be covered with canvas or other similar material 13$^a$ to provide a rough surface to facilitate the withdrawal of the solids from the vessel 1.

The drum shafts 11 are so positioned that the peripheries of the drums 13, 14, rotate in close proximity to the curved extensions 8 (the latter are curved to correspond to the peripheries of the drums) and so that they provide between them an outlet 15 at the center of the aperture 12, see Figs. 1 and 2.

On the ends of the shafts 11 at one side of the aperture 12, are keyed or otherwise fixed gear wheels 16, 17, which serve for transmitting the motion from the one shaft to the other to revolve the drums in opposite directions as indicated by the arrows in Fig. 1. I prefer to use wheels of different diameters so that one drum is driven at a higher speed than the other in order to subject the solids as they are being withdrawn by the rotation of the drums to a squeezing action to more effectually remove the liquid or to obtain a drier product. On the other end of one of the shafts 11 is fixed a worm wheel 18 and journaled in bearings 19 above the worm wheel 18, is a driving shaft 20 on which is provided a worm 21 engaging the worm wheel 18.

22, 23, represent fast and loose pulleys on the shaft 20.

The means illustrated for making a liquid-tight joint between the piece 6 and the peripheries of the drums 13, 14, consist of two wedge-shaped members 24, positioned at opposite sides of the piece 6 and in close proximity to the peripheries of the drums. These wedge-shaped members 24, which are plane on those sides next the piece 6 and are curved on those sides next the drums, are preferably covered with canvas, rubber or other suitable resilient material 24$^a$ (see Fig. 6) for making the joints between the casting and drums. To each wedge 24 (see more particularly Fig. 5) is rotatably connected a screw-threaded spindle 25, the connection as shown being made by means of a pin 26 engaging an annular groove in the spindle. To the upper extremity of the spindle 25 is attached a hand-wheel 27 for rotating the screw. The screw 25 is adapted to work through an interiorly threaded piece 28 carried by a stay 29.

30 represents brackets fixed to the piece 6 through holes in which work guide-pins 31 attached to the wedge 24. The joints between the other sides of the piece or casting 6 and the drums 13, 14, are made by means of movable side plates 32 curved and flanged along the outer edges to fit the peripheries of the drums—see Figs. 1, 4 and 10. Between the inner inclined edges of these side plates 32 is positioned a wedge 33. The latter is constructed at its upper end with a projection 34 to which is revolubly attached one end of a screw 35, the connection being made by a pin 36 engaging an annular groove in the screw. The screw 35 is adapted to work through an interiorly threaded piece or stationary nut 36$^a$ fixed to the casting 6. Each wedge 33 is constructed with a vertical slot 37 through which projects a stud 38 screwed to the vertical extension 8 of the casting 6.

39 is a nut screwed over the outer end of the stud 38 for securing the wedge. Each of the movable side plates 32 is constructed with a slot 40 with which a stud 41 screwed to the extension 8 engages, and 42 is a nut on the outer end of said stud for retaining the side plate 32 in position.

For closing the opening 15 formed between the drums 13, 14, I provide a wedge-shaped member 43, (see Figs. 7 and 8) on the ends of which are formed projections 44 adapted to move between vertical guides 45$^a$ fixed to two of the angle irons 9 at the ends of the drums. In each of the projections 44 is formed a screw-threaded hole through which a screw 45 works. To the lower end of each screw 45 is fixed a bevel wheel 46.

47, see Fig. 3, are brackets fixed to the guides 45$^a$ for revolubly supporting a spindle 48 on which are fixed two bevel wheels 49 meshing the bevel wheels 46 on the lower ends of the screws 45.

50 is a hand-wheel for rotating the spindle 48.

The wedge-shaped member 43, as shown more particularly in Fig. 8, is curved to correspond to the peripheries of the drums 13, 14. The curved sides of this wedge 43 may be covered with canvas, rubber or other suitable resilient material 43$^a$ (see Fig. 8) to make a good joint. The wedge 43 may be utilized as the means for supplying water or other liquid to wash the surfaces of the drums 13, 14. For this purpose a hole 51 may be formed longitudinally of the wedge 43 (see Figs. 7 and 8) and upwardly directed slots 52 be formed through the sides of the wedge 43 communicating with said hole 51.

53, in Fig. 8, represents a pipe for conducting the liquid into the hole 51 and 54 a hose or other flexible pipe for conveying the liquid to pipe 53.

In Fig. 1 a scraper is shown in operative position for each drum for scraping off the solids adhering to the surfaces of the drums. Each of these scrapers as shown comprises a plate 55 (which extends preferably the full width of the drum) pivoted at 56 and retained in contact with the surface of the drum by means of a weighted lever 57.

The operation of the apparatus is as follows:—Before the mixture of solids and liquid is run into the vessel 1 the several joints between the drums 13, 14, and casting 6 and the opening 15 formed between the drums, are tightly closed by screwing down the wedges 24, between the sides of the casting 6 and upper surfaces of the drums, and the wedges 43 which force the curved and flanged edges of the movable side plates 32 into contact with the ends of the drums, and by screwing up the wedge 43 to close the opening 15. The mixture of solids and liquid is now admitted to the vessel 1, the solids settling in the bottom of the vessel and the liquid overflowing into the rim launder 3. When a sufficient quantity of the solids has settled in the vessel then the wedges 24 are raised out of contact with the drums 13, 14, the wedges 33 raised and the side plates 32 moved inward clear of the peripheries of the drums and secured by means of the nuts 42, and the wedge 43 lowered clear of the drums. Motion is then imparted to the drum shafts 11 through the driving mechanism and the settled solids are then continuously withdrawn by the action of the drums 13, 14, through the opening 15 formed between them. If necessary the liquid supply can be turned on to wash off the solids adhering to the surfaces of the drums. By regulating the speed of rotation of the drums, a more or less constant level of the settled solids can be maintained in the vessel.

What I claim as my invention and desire to protect by Letters Patent is:—

1. In means for separating comminuted ores or other solid matter from liquids, in combination, a settling vessel having an aperture for the withdrawal of the settled solids, a pair of cylinders arranged to partially close said aperture and to provide between them an outlet for the solids, means for making joints between the sides of the vessel and the circumference of the cylinders comprising wedge shaped members plane on those sides next the vessel and curved on those sides next the cylinders, coverings of resilient material upon said members guiding means for said members and means for raising and lowering said members in their guiding means as set forth.

2. In means for separating comminuted ores or other solid matter from liquids, in combination, a settling vessel having an aperture for the withdrawal of the settled solids, a pair of cylinders arranged to partially close said aperture and to provide between them an outlet for the solids, means for making joints between the sides of the vessel and the circumference of the cylinders comprising wedge shaped members guiding means for said members comprising pins fixed to the wedge and brackets fixed to the vessel and means for raising and lowering said members comprising a screw threaded spindle revolubly attached to each member and a stationary internally threaded piece through which the screw may work and means for rotating the screw as set forth.

3. In means for separating comminuted ores or other solid matter from liquids, in combination, a settling vessel having an aperture for the withdrawal of the settled solids, a pair of cylinders arranged to partially close said aperture and to provide between them an outlet for the solids, means for making joints between the sides of the vessel and the ends of the cylinders comprising movable side plates curved and flanged along the outer edges to fit the peripheries of the cylinders and inclined along their inner edges, guiding means for said side plates and a wedge shaped member positioned between the inner inclined edges of the side plates, guiding means for said wedge member and means for raising and lowering said member as set forth.

4. In means for separating comminuted ores or other solid matter from liquids, in combination, a settling vessel having an aperture for the withdrawal of the settled solids, a pair of cylinders arranged to partially close said aperture and to provide between them an outlet for the solids, means for making joints between the sides of the vessel and the ends of the cylinders comprising movable side plates curved and flanged along the outer edges to fit the peripheries of the cylinders and inclined along their inner edges, guiding means for said side plates, said means comprising studs fixed to the vessel engaging slots in the side plates and a wedge shaped member positioned between the inner inclined edges of the side plates, guiding means for said wedge member and means for raising and lowering said member as set forth.

5. In means for separating comminuted ores or other solid matter from liquids, in combination, a settling vessel having an aperture for the withdrawal of the settled solids, a pair of cylinders arranged to partially close said aperture and to provide between them an outlet for the solids, means for making joints between the sides of the vessel and the ends of the cylinders comprising movable side plates curved and flanged along the outer edges to fit the peripheries of the cylinders and inclined along their inner edges, guiding means for said side plates and a wedge shaped member positioned between the inner inclined edges of the side plates, guiding means for said wedge member comprising a stud screwed to the vessel engaging a slot in said member and means for raising and lowering said wedge member comprising a screw revolubly attached to the member and a stationary nut fixed to the vessel through which the screw can work as set forth.

6. In means for separating comminuted ores or other solid matter from liquids, in combination, a settling vessel, a truncated pyramidal piece or casting fixed to the bottom of said vessel, said piece or casting being constructed on two opposite sides with downwardly projecting extensions curved at the sides, a pair of cylinders arranged to partially close the aperture formed in the aforesaid piece or casting, means for making a liquid tight joint between two opposite sides of the casting and the circumference of the cylinders means attached to the downwardly projecting extensions for making a liquid tight joint between the ends of the cylinders and the piece or casting and means for making a liquid tight joint between the cylinders beneath the piece or casting as set forth.

7. In means for separating comminuted ores or other solid matter from liquids, in combination, a settling vessel having an aperture for the withdrawal of the settled solids, a pair of cylinders arranged to partially close said aperture and to provide between them an outlet for the solids, means for making joints between the sides of the vessel and the circumference of the cylinders means for closing a passage provided between the cylinders said means comprising a wedge shaped member curved to fit the peripheries of the cylinders, guiding means for said member and means for raising and lowering said member in its guiding means as set forth.

8. In means for separating comminuted ores or other solid matter from liquids, in combination a settling vessel having an aperture for the withdrawal of the settled solids, a pair of cylinders arranged to partially close said aperture and to provide between them an outlet for the solids, means for making joints between the sides of the vessel and the circumference of the cylinders means for closing a passage provided between the cylinders said means comprising a wedge shaped member curved to fit the peripheries of the cylinders, guiding means for said member, said means comprising stationary guides engaged by the ends of the member and means for raising and lowering said member, said latter means comprising screws adapted to work through screw-threaded holes in the ends of said member and means for synchronously operating the screws for both ends of same member as set forth.

9. In means for separating comminuted ores or other solid matter from liquids, in combination a settling vessel having an aperture for the withdrawal of the settled solids, a pair of cylinders arranged to partially close said aperture and to provide between them an outlet for the solids, means for making joints between the sides of the vessel and the circumference of the cylinders means for closing a passage provided between the cylinders said means comprising a wedge shaped member curved to fit the peripheries of the cylinders guiding means for said member, said means comprising stationary guides engaged by the ends of the member, and means for raising and lowering said member, said latter means comprising screws adapted to work through screw-threaded holes in the ends of said member and means for synchronously operating the screws for both ends of said member, said means comprising a spindle, brackets supporting said spindle means for rotating said spindle and bevel wheels on the spindle and screws as set forth.

10. In means for separating comminuted ores or other solid matter from liquids in combination a settling vessel having an aperture at the bottom for the withdrawal of the settled solids, a pair of cylinders arranged to partially close said aperture and to provide between them an outlet for the solids, means for closing the outlet passage provided between the cylinders, said means comprising a wedge shaped member arranged beneath the passage, said member having a longitudinal hole, and upwardly directed apertures through the sides communicating with said hole, guiding means for said member means for raising and lowering said member in its guiding means and tubular connections communicating with the longitudinal hole for conducting liquid thereinto to wash off any adhering solids from the surfaces of the cylinders, as set forth.

In testimony whereof I have signed my name to this specification in the presence of two subscribing witnesses.

ALEXANDER JOHN ARBUCKLE.

Witnesses:
CHAS. OVENDALE,
F. A. OVENDALE.